(12) United States Patent
Eick et al.

(10) Patent No.: US 8,167,082 B2
(45) Date of Patent: May 1, 2012

(54) SEISMIC TRANSDUCERS HAVING IMPROVED POLYGONAL BASEPLATES AND METHODS OF USE

(75) Inventors: Peter M. Eick, Houston, TX (US); Joel D. Brewer, Houston, TX (US); Shan Shan, Houston, TX (US)

(73) Assignee: ConocoPhillips Company, Houston, TX (US)

( * ) Notice: Subject to any disclaimer, the term of this patent is extended or adjusted under 35 U.S.C. 154(b) by 0 days.

(21) Appl. No.: 13/027,982

(22) Filed: Feb. 15, 2011

(65) Prior Publication Data

US 2011/0198147 A1   Aug. 18, 2011

Related U.S. Application Data

(60) Provisional application No. 61/305,689, filed on Feb. 18, 2010, provisional application No. 61/305,692, filed on Feb. 18, 2010, provisional application No. 61/305,697, filed on Feb. 18, 2010.

(51) Int. Cl.
*G01V 1/04* (2006.01)
(52) U.S. Cl. ........................................ 181/121; 181/113
(58) Field of Classification Search .................. 181/121, 181/113
See application file for complete search history.

(56) References Cited

U.S. PATENT DOCUMENTS

| | | | |
|---|---|---|---|
| 3,106,982 A | 10/1963 | Wade | |
| 3,282,372 A | 11/1966 | Brown et al. | |
| 3,427,706 A | 2/1969 | Jaffee | |
| 4,317,501 A * | 3/1982 | Gleize | 181/121 |
| 4,655,314 A | 4/1987 | Airhart | |
| 4,664,222 A * | 5/1987 | Jones et al. | 181/113 |
| 4,721,181 A * | 1/1988 | Airhart et al. | 181/114 |
| 4,875,544 A * | 10/1989 | Airhart | 181/113 |
| 2005/0224279 A1* | 10/2005 | Gilmer et al. | 181/121 |
| 2007/0205042 A1* | 9/2007 | Temple et al. | 181/121 |

OTHER PUBLICATIONS

European Patent Office, Registered Letter, EP 11 154 303.9, Jul. 1, 2011, 5 pages.
European Patent Office, European Search Report, EP 11 15 4303.9, Jun. 7, 2011, 4 pages.
PCT Notification of Transmittal of the International Search Report and the Written Opinion of the International Searching Authority, or the Declaration, Forms PCT/ISA/220, 210 and 237, Date of Mailing: Apr. 19, 2011, 12 pages.

* cited by examiner

*Primary Examiner* — Forrest M Phillips
(74) *Attorney, Agent, or Firm* — ConocoPhillips Company

(57) ABSTRACT

Methods and systems are provided for inducing seismic energy waves in a subterranean formation. More specifically, seismic transducers are provided that incorporate enhanced seismic baseplates. In certain embodiments, baseplates comprise certain enhancements such as having a perimeter in the shape of a polygon, such as, a hexagon or an octagon. In other embodiments, the perimeter of the baseplate may take the form of a polygon having n sides, where n is any integer greater than 4. Advantages of such baseplate enhancements include, but are not limited to, a reduction of baseplate harmonics or ringing, enhanced baseplate strength so as to reduce baseplate fatigue or failure, a reduction of baseplate flexure, and a consequent reduction of baseplate weight resulting in a more responsive baseplate. These advantages ultimately translate to improved seismic surveys, having higher resolution of the formations surveyed and resulting in surveys reaching greater depths.

22 Claims, 4 Drawing Sheets

SEISMIC TRANSDUCERS HAVING IMPROVED POLYGONAL BASEPLATES AND METHODS OF USE

CROSS-REFERENCE TO RELATED APPLICATIONS

This application is a non-provisional application which claims the benefit of and priority to U.S. Provisional Application Ser. No. 61/305,689, filed Feb. 18, 2010, entitled "Seismic Transducers Having Improved Polygonal Baseplates and Methods of Use", U.S. Provisional Application Ser. No. 61/305,692, filed Feb. 18, 2010, entitled "Seismic Transducers Having Reduced Surface Area Baseplates and Methods of Use", and U.S. Provisional Application Ser. No. 61/305,697, filed Feb. 18, 2010, entitled "Seismic Transducers and Baseplates Having External Dampeners and Methods of Use", all disclosures of which are hereby incorporated by reference.

FIELD OF THE INVENTION

The present invention relates generally to methods and systems for inducing seismic vibrations into an elastic medium. More particularly, but not by way of limitation, embodiments of the present invention include methods and systems for inducing seismic vibrations into subterranean formations utilizing improved seismic baseplates.

BACKGROUND

Various methods of geophysical exploration have been developed to aid in the determining the nature of subterranean formations for exploratory oil and gas drilling. Several surveying systems have been developed that utilize one or more vibratory energy sources to induce seismic waves that are directed into the ground and reflected back to the surface by different geological subsurface layers.

In these reflection-type seismic surveys, the reflected seismic waves are detected at the surface by a group of spaced apart receivers called geophones, accelerometers, seismometers or similar transducers. These transducers are collectively referred to as "geophones" herein following industry convention, but it is understood that they could be any sensor that converts seismic energy into some readable data. The reflected seismic waves detected by the geophones are analyzed and processed to generate seismic data representative of the nature and composition of the subterranean formation at various depths, including the nature and extent of hydrocarbon deposits. In this way, the seismic information collected by geophones can be used to produce seismic reflection signals which can be processed to form images of the subsurface.

It has become common in many cases to use, as the source of propagating elastic waves, a hydraulically-operated vibratory source more simply referred to as a vibrator. There are other forms of energy sources for vibrators like electromechanical or pure electric. All of these systems typically generate vibrations or shock waves by using a reaction mass member that is actuated by a hydraulic or electric system and electrically controlled by a servo valve. In a typical embodiment, a vibrator comprises a double ended piston rigidly affixed to a coaxial piston rod. The piston is located in reciprocating relationship in a cylinder formed within a heavy reaction mass. Means are included for alternately introducing hydraulic fluid under high pressure to opposite ends of the cylinder or for an electric coil and magnet type assembly to impart a reciprocating motion to the piston relative to the reaction mass. The piston rod extending from the reaction mass is rigidly coupled to a baseplate, which is maintained in intimate contact with ground surface. Since the inertia of the reaction mass tends to resist displacement of the reaction mass relative to the earth, the motion of the piston is coupled through the piston rod and baseplate to impart vibratory seismic energy in the earth.

Typically, vibrators are transported by carrier vehicle, and it is also known to prevent decoupling of the baseplate from the ground by applying a portion of the carrier vehicle's weight to the baseplate during operation. The weight of the carrier vehicle is frequently applied to the baseplate through one or more spring and stilt members, each having a large compliance, with the result that a static bias force is imposed on the baseplate, while the dynamic forces of the baseplate are decoupled from the carrier vehicle itself. In this way, the force from the vibrating mass is transferred through the baseplate into the earth at a desired vibration frequency. The hydraulic system forces the reaction mass to reciprocate vertically, at the desired vibration frequency, through a short vertical stroke.

This type of vibrational seismic exploration system typically uses a quasi-sinusoidal reference signal, or so-called pilot signal, of continuously varying frequency, selected band width, and selected duration to control the introduction of seismic waves into the earth. The pilot signal is converted into a mechanical vibration in a land vibrator having a baseplate which is coupled to the earth. The land vibrator is typically mounted on a carrier vehicle, which provides locomotion. During operation, the baseplate is contacted with the earth's surface and the weight of the carrier vehicle is applied to the baseplate. A servo-hydraulic piston connected to the baseplate is then excited by the pilot signal, causing vibration of the baseplate against the earth.

A significant problem with conventional systems employing a vibrating baseplate to impart seismic waves into the earth is that the actual motion of the baseplate, and thus the actual seismic energy imparted to the earth, is different from the ideal motion represented by the pilot signal. This difference can be caused by a variety of factors, including (1) harmonic distortion or "ringing" of the baseplate, (2) decoupling of the baseplate from the earth's surface commonly referred to as bouncing or "pogo-sticking," and (3) flexure of the baseplate. The differences between the pilot signal and the actual baseplate motion are problematic because, in the past, the pilot signal was used to pulse-compress the reflected seismic signal either through correlation or inversion. Thus, where the actual motion of the baseplate differs from the ideal motion corresponding to the pilot signal, the pulse-compressed reflected seismic signal that is produced by correlation or more modernly by inversion is inaccurate.

The data gathering and correlating portion of the various seismic exploration systems have been improved to the point that problems have been discovered with the performance of existing baseplates. These problems are related to the fact that baseplates have resonant frequencies and they also vibrate, both of which produce distortions in the generated energy signal. These distortions are carried completely through the process and detrimentally affect the geological information produced.

Accordingly, these deficiencies of conventional baseplates (e.g. harmonics, decoupling, and baseplate flexure) are problematic in that each of these problems contribute to producing a distorted seismic signal. Baseplate flexure is not only problematic from the standpoint of generating a distorted seismic signal, but it is also problematic, because flexure of the baseplate contributes to structural failure of the baseplate.

Accordingly, there is a need in the art for improved seismic vibrator assemblies and the baseplates thereof that address one or more disadvantages of the prior art.

SUMMARY

The present invention relates generally to methods and systems for inducing seismic vibrations into an elastic medium. More particularly, but not by way of limitation, embodiments of the present invention include methods and systems for inducing seismic vibrations into subterranean formations utilizing improved seismic baseplates.

An example of a method for inducing seismic energy waves in a subterranean formation comprises the steps of: providing a seismic transducer apparatus comprising a frame, a baseplate attached to the frame, the baseplate having a flat lower surface for engagement of a ground surface, the baseplate having a circumference; a reaction mass supported by the frame, and a driver configured to actuate the reaction mass in a reciprocating motion; wherein the circumference of the baseplate is in the form of a polygon, wherein the polygon comprises at least five sides; engaging the ground surface with the baseplate; actuating the reaction mass via the driver in a reciprocating motion; allowing vibratory energy to be imparted to the baseplate so as to propagate seismic energy waves in the subterranean formation; allowing the seismic energy waves to propagate through the subterranean formation so as to produce reflected and refracted seismic energy waves; and detecting one or more of the reflected and refracted seismic energy waves.

An example of a seismic transducer apparatus for inducing energy waves in an elastic medium comprises: a frame; a baseplate attached to the frame, the baseplate having a flat lower surface for engagement of a surface of an elastic medium, the flat lower surface having a perimeter, wherein the perimeter is in the form of a polygon, wherein the polygon comprises at least five sides; a reaction mass supported by the frame; and a driver configured to actuate the reaction mass in a reciprocating motion so as to impart vibratory energy to the baseplate.

An example of a seismic vibrator apparatus comprises: a frame; a baseplate attached to the frame, the baseplate having a lower surface for engagement of a ground surface, the lower surface having a perimeter, wherein the perimeter is in the form of a polygon, wherein the polygon comprises at least five sides; wherein the base plate is comprised of an upper plate, a lower plate, and one or more members that extend from the upper plate to the lower plate so as to couple the upper plate to the lower plate; a reaction mass supported by the frame; and a driver configured to actuate the reaction mass in a reciprocating motion so as to impart vibratory energy to the baseplate.

The features and advantages of the present invention will be apparent to those skilled in the art. While numerous changes may be made by those skilled in the art, such changes are within the spirit of the invention.

BRIEF DESCRIPTION OF THE DRAWINGS

A more complete understanding of the present disclosure and advantages thereof may be acquired by referring to the following description taken in conjunction with the accompanying figures, wherein.

Figure 1:
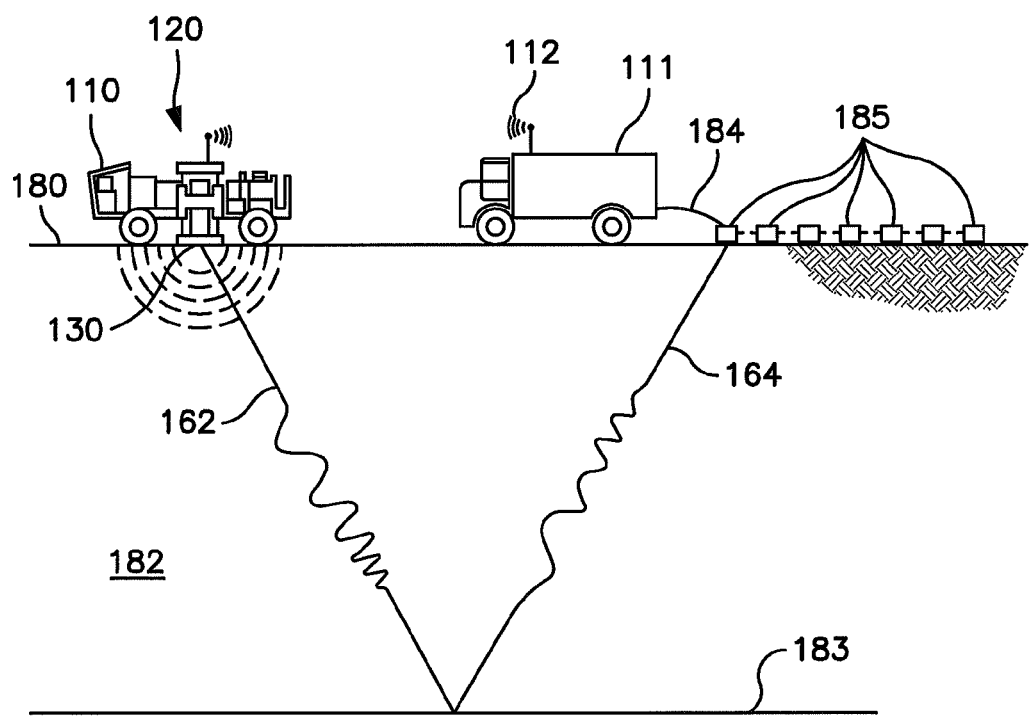
FIG. 1 illustrates a side view of one example of a seismic exploration system in accordance with one embodiment of the present invention.

While the present invention is susceptible to various modifications and alternative forms, specific exemplary embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

The present invention relates generally to methods and systems for inducing seismic vibrations into an elastic medium. More particularly, but not by way of limitation, embodiments of the present invention include methods and systems for inducing seismic vibrations into subterranean formations utilizing improved seismic baseplates.

Methods and systems are provided for inducing seismic energy waves in a subterranean formation. In certain embodiments, seismic transducers in accordance with the present invention comprise a frame, a reaction mass supported by the frame, a driver, and a baseplate attached to the frame. The driver actuates the reaction mass in a reciprocating motion, imparting a vibratory energy to the baseplate. As the baseplate is engaged with a ground surface during operation, the vibratory energy of the baseplate is imparted directly to the ground surface so as to propagate seismic waves into the subterranean formation. The seismic waves are then reflected and refracted by the subsurface strata and geological features of the subterranean formation. The reflected and refracted seismic waves may then be detected by a plurality of seismic detectors. The detected seismic data is then interpreted to reveal seismic information representative of the surveyed subsea region of the earth.

In certain embodiments, baseplates of the present invention may include certain enhancements such as having a perimeter in the shape of a polygon, such as, for example, an octagon. Advantages of such baseplate enhancements include, but are not limited to, a reduction of baseplate harmonics or ringing, enhanced baseplate strength so as to reduce baseplate fatigue, subsequent fracture, or failure, a reduction of baseplate flexure, and a consequent reduction of baseplate weight resulting in a baseplate more responsive to actuation. These advantages ultimately translate to improved seismic surveys, reaching greater depths and/or having higher resolution. Reduced baseplate flexure and harmonics significantly enhances the resolution of the higher frequency data in typical geological depths.

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations that come within the scope of the invention.

FIG. 1 illustrates a side view of one example of a seismic exploration system in accordance with one embodiment of the present invention. A pilot signal is generated in recorder/processor carrier vehicle 111 and sent by radio wave link 112 to a land vibrator 120. Land vibrator 120 converts the pilot signal into mechanical motion that vibrates baseplate 130. Baseplate 130 contacts ground surface 180 of the earth and is coupled to ground surface 180 by the weight of carrier vehicle 110. Baseplate 130 induces seismic waves 162 into subsurface 182 of the earth. Induced seismic wave 162 travels downward through subsurface 182 and is altered (i.e., refracted and/or reflected) by subsurface strata 183. Altered seismic waves 164 travels from subsurface strata 183 upward through subsurface 182 to surface 180. Seismic receivers 185, such as geophones, located on surface 180, are generally spaced apart from each other and from land vibrator 120. Seismic receivers 185 measure altered seismic waves 164 at surface 180 and transmit an altered seismic signal indicating altered seismic wave 28 across geophone lines 184 to recorder/processor carrier vehicle 110. This communication may be accomplished via wires conventionally, or with autonomous recorders where the data is later collected and transcribed to the recording media. A baseplate signal is transmitted from land vibrator 120 via radio wave link 112 to recorder/processor carrier vehicle 110 for processing. In this way, seismic survey data is collected and interpreted so as to reveal the nature and the geology of subterranean formation 182.

Figure 2:
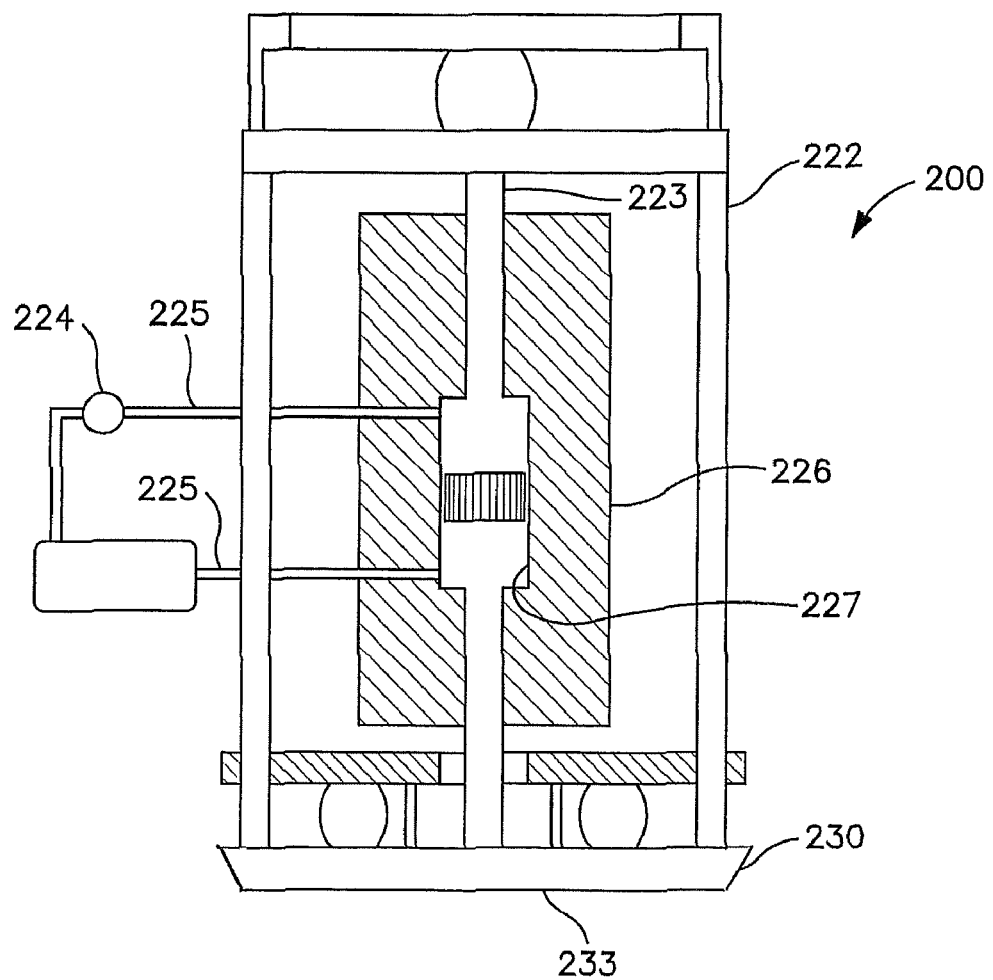
FIG. 2 illustrates a side view of one example of a seismic transducer in accordance with one embodiment of the present invention.

FIG. 2 illustrates a side view of one example of a seismic transducer in accordance with one embodiment of the present invention. Seismic transducer apparatus 200 utilizes a reciprocating motion of reaction mass 225 to impart vibratory energy to baseplate 230.

More specifically, frame 222 supports and is rigidly connected to piston rod 223 and baseplate 230. Driver 224 pumps or otherwise supplies hydraulic fluid to hydraulic cylinder 227 through ports 225. In this way, driver 224 actuates reaction mass 226 about piston rod 223. When vibrations are induced by controlled hydraulic fluid flow into and from cylinder 227, reciprocating motion of reaction mass 226 is generated about piston rod 223. As reaction mass 226 is supported by frame 222, this reciprocating motion is transmitted to baseplate 230 via the inertia of reaction mass 226. The term, "supported," as used herein, explicitly includes being indirectly supported by frame 222, for example, by hydraulic fluid in hydraulic cylinder 227. In this way, vibratory energy is imparted to baseplate 230 corresponding to the motion of reaction mass 226. Baseplate 230 then transmits the vibratory energy to a ground surface (such as ground surface 180 depicted in FIG. 1) via flat lower surface 233. In certain embodiments, baseplate 230 comprises angled edges along the perimeter of baseplate 230. These angled edges, e.g. edges that are deviated from the vertical or non-perpendicular) aid in the clearing of mud or other soil or sludge that may accumulate along the perimeter of baseplate 230. As described further herein, baseplate 230 comprises one or more improvements for producing an enhanced baseplate.

Figure 3A:
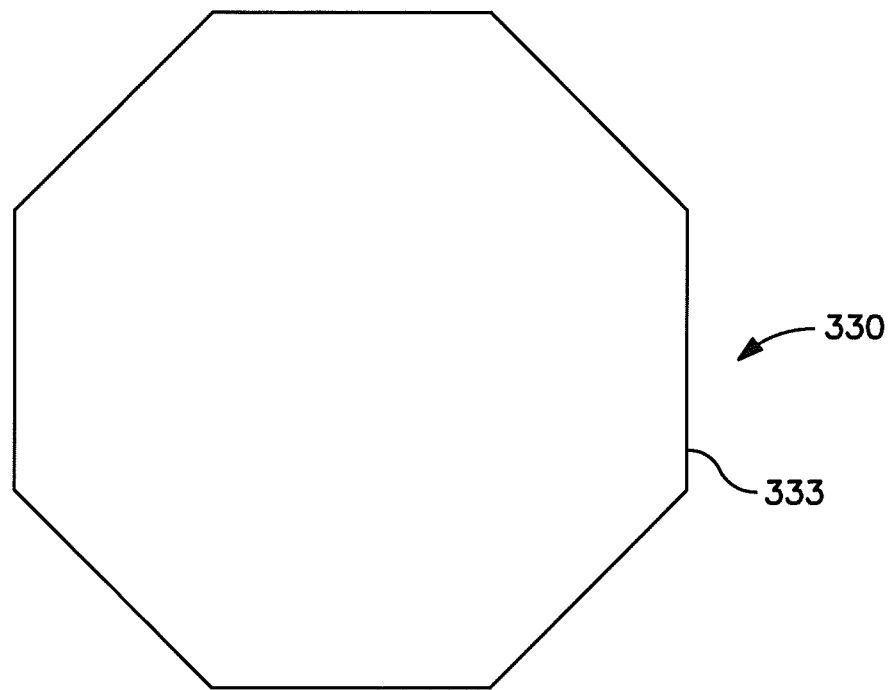
FIG. 3A illustrates a top view of an octagonal baseplate in accordance with one embodiment of the present invention.

FIG. 3A illustrates a top view of an octagonal baseplate in accordance with one embodiment of the present invention. In certain embodiments, perimeter 333 of baseplate 330 forms the shape of a polygon, having n sides, where n may be any integer greater than 4. In the example depicted in FIG. 3A, perimeter 333 of baseplate 330 is in the shape of an octagon. Although baseplate 330 depicted in FIG. 3A is shown here as an equilateral polygon, it is recognized that perimeter 333 of baseplate 330 may form an irregular polygon.

The octagonal shape of perimeter 333 of baseplate 330 reduces the flexure problems that are experienced particularly by circular baseplates, which is caused by the nature of their construction. This reduction in flexure of baseplate 330 reduces harmonics and ringing of baseplate 330. Likewise, the octagonal shape also dramatically reduces the fatigue and failure rate of baseplate 330. Additionally, the octagonal shape of baseplate 330 reduces the weight of baseplate 330 relative to a conventional rectangular or circular baseplate, which results in a more responsive baseplate.

Figure 3B:
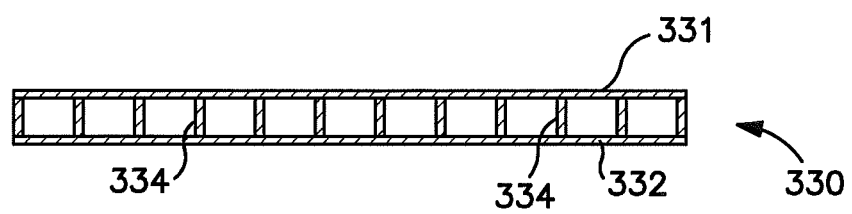
FIG. 3B illustrates a side view of an octagonal baseplate in accordance with one embodiment of the present invention.

FIG. 3B illustrates a side view of an octagonal baseplate in accordance with one embodiment of the present invention. Baseplate 330 comprises upper plate 331, lower plate 332, and a plurality of walls 334. Walls 334 extend between upper plate 331 and lower plate 332 so as to join or otherwise couple upper plate 331 to lower plate 332. In certain embodiments, upper plate 331, lower plate 332, and a plurality of walls 334 is formed as one integral unit, such as, being cast from a one or more dies or molds.

Forming baseplate 330 from a solid steel baseplate structure would impose a severe weight penalty on the vibrating mechanism. The alternate structure depicted in FIG. 3B however provides a much lighter weight baseplate while preserving a relatively reinforced structure resistant to flexure and fatigue failures. In this way, baseplate 330 may be maintained within acceptable weight limitations and yet be capable of withstanding the large forces generated by a seismic transducer.

Figure 4A:
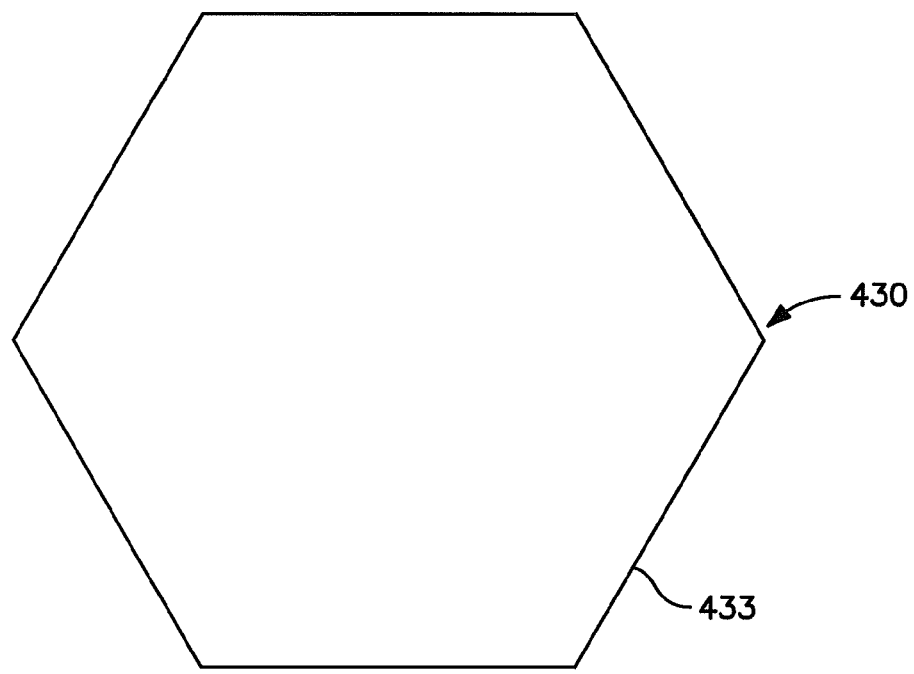
FIG. 4A illustrates a top view of a hexagonal baseplate in accordance with one embodiment of the present invention.

FIG. 4A illustrates a top view of a hexagonal baseplate in accordance with one embodiment of the present invention. Here, perimeter 433 of baseplate 430 is in the shape of a hexagon. Once again, this polygonal shape offers one or more of the aforementioned advantages over circular and rectangular baseplates. Among other mechanisms, the polygonal shape provides enhanced coupling of the baseplate with any organic surface layer that may be present on the ground (e.g. grass or other foliage). The reduced surface area of the polygonal shape concentrates the force applied into a more limited surface area and offers enhanced compression of the organic layer to achieve the enhanced coupling of the baseplate and the ground surface.

Indeed, the polygonal shape of baseplate 430 allows seismic transducers that incorporate baseplate 430 to operate at higher seismic frequencies ranges without producing substantial signal distortion or noise. In certain embodiments, seismic transducers of the present invention operate at frequency ranges extending into the higher seismic frequency range of at least about 80 cycles per second, at least about 150 cycles per second, and/or at least about 250 cycles per second.

Figure 4B:
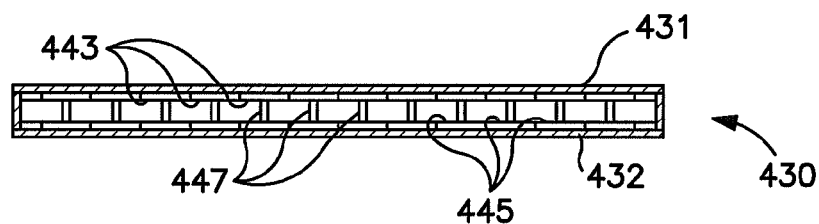
FIG. 4B illustrates a side view of a hexagonal baseplate in accordance with one embodiment of the present invention.

FIG. 4B illustrates a side view of a hexagonal baseplate in accordance with one embodiment of the present invention. Here, upper plate 431 and lower plate 432 are in the shape of a polygon and more specifically, take the shape of a hexagon. It is recognized that the perimeter of upper plate 431 and/or lower plate 432 may take the form of a polygonal shape. In certain embodiments, only lower plate 432 takes the form of a polygon.

Here, baseplate 430 is constructed from a plurality of parallel steel I-beams. Each I-beam is formed from an upper flange 443, a lower flange 445, and a web 447 that joins upper flange 443 to lower flange 445. The longitudinal axes of the I-beams are located parallel to one another and adjacent I-beams are oriented so the edges of their upper and lower flanges are abutting (the webs of the I-beams lie in vertical planes). The I-beam flanges may be welded together so as to provide a unitary structure, which may be further reinforced by optional upper and lower reinforcing plates 431 and 432. It will be appreciated that this type of structure provides great resistance to stress exerted along the longitudinal axis of the I-beams, yet would be substantially lighter than a solid cast plate.

Figure 5:
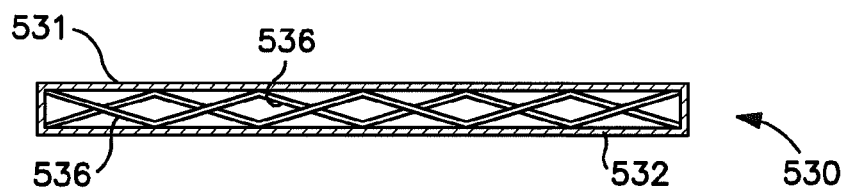
FIG. 5 illustrates a side view of a baseplate having a plurality of truss members in accordance with one embodiment of the present invention.

FIG. 5 illustrates a side view of a baseplate having a plurality of truss members in accordance with one embodiment of the present invention. Here, baseplate 530 is depicted comprising upper plate 531, lower plate 532, and a plurality of truss members 536. Truss members 536 extend between upper plate 531 and lower plate 532 so as to join or otherwise couple upper plate 531 to lower plate 532.

It is explicitly recognized that any of the elements and features of each of the devices described herein are capable of use with any of the other devices described herein with no limitation. Furthermore, it is explicitly recognized that the steps of the methods herein may be performed in any order except unless explicitly stated otherwise or inherently required otherwise by the particular method.

It is recognized that either upper plate 531 or lower plate 532 may be formed in the shape of the aforementioned polygons. Alternatively, both upper plate 531 and lower plate 532 may be formed in the shape of the aforementioned polygons.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations and equivalents are considered within the scope and spirit of the present invention.

What is claimed is:

1. A method for inducing seismic energy waves in a subterranean formation comprising the steps of:
   providing a seismic transducer apparatus comprising a frame, a baseplate attached to the frame, the baseplate having a flat lower surface for engagement of a ground surface, the baseplate having a circumference, a reaction mass supported by the frame, and a driver configured to actuate the reaction mass in a reciprocating motion;
   wherein the circumference of the baseplate is in the form of a polygon, wherein the polygon comprises at least five sides to form a polygonal baseplate;
   engaging the ground surface with the polygonal baseplate;
   actuating the reaction mass via the driver in a vertical reciprocating motion;
   allowing vibratory energy to be imparted vertically to the flat lower surface of the polygonal baseplate so as to propagate seismic energy waves downward in the subterranean formation;
   allowing the seismic energy waves to propagate through the subterranean formation so as to produce reflected and refracted seismic energy waves; and
   detecting one or more of the reflected and refracted seismic energy waves.

2. The method of claim 1 further comprising the step of actuating the reaction mass at an operating frequency range extending into a higher seismic frequency range above about 80 cycles per second.

3. The method of claim 2 further comprising the step of actuating the reaction mass at an operating frequency range extending into a higher seismic frequency range above about 160 cycles per second.

4. The method of claim 1 further comprising the step of actuating the reaction mass over a frequency sweep that includes one or more operating frequencies extending into a higher seismic frequency range above about 150 cycles per second.

5. The method of claim 4 wherein the polygon is an octagon, wherein the polygonal baseplate comprises an upper plate, a lower plate, and a plurality of walls that extend from the upper plate to the lower plate.

6. The method of claim 5 wherein the walls are perpendicular to the upper place and the lower plate, wherein the walls are parallel to each other.

7. A seismic transducer apparatus for inducing energy waves in an elastic medium comprising:
   a frame;
   a baseplate attached to the frame, the baseplate having a flat lower surface for engagement of a surface of an elastic medium, the flat lower surface having a perimeter, wherein the perimeter is in the form of a polygon, wherein the polygon comprises at least five sides to form a polygonal baseplate;
   a reaction mass supported by the frame; and
   a driver configured to actuate the reaction mass in a vertically reciprocating motion so as to impart vibratory energy to the flat lower surface of the polygonal baseplate.

8. The seismic transducer apparatus of claim 7 wherein the polygon comprises at least 6 sides.

9. The seismic transducer apparatus of claim 8 wherein the polygon is a hexagon.

10. The seismic transducer apparatus of claim 7 wherein the polygon comprises at least 7 sides.

11. The seismic transducer apparatus of claim 7 wherein the polygon comprises at least 8 sides.

12. The seismic transducer apparatus of claim 10 wherein the polygon is an octagon.

13. The seismic transducer apparatus of claim 7 wherein the polygonal baseplate comprises an upper plate, a lower plate, and a plurality of walls that extend from the upper plate to the lower plate, wherein the walls are perpendicular to the upper place and the lower plate, wherein the walls are parallel to each other.

14. The seismic transducer apparatus of claim 7 wherein the polygonal baseplate comprises an upper plate, a lower plate, and a plurality of walls that extend from the upper plate to the lower plate.

15. The seismic transducer apparatus of claim 7 wherein the polygon is equilateral.

16. The seismic transducer apparatus of claim 7 wherein the polygonal baseplate comprises an upper plate, a lower plate, and a plurality of I-beams, wherein each I-beams has an upper flange and a lower flange with a web extending therebetween, wherein the upper flange is joined to the upper plate and the lower flange is joined to the lower plate so as to couple the upper plate, the lower plate, and the plurality of I-beams into one unitary structure.

17. The seismic transducer apparatus of claim 16 wherein the I-beams are disposed parallel and adjacent to one another.

18. The seismic transducer apparatus of claim 17 wherein the polygonal baseplate is casted from a single mold to form an integral unit.

19. The seismic transducer apparatus of claim 7 wherein the polygonal baseplate comprises an upper plate, a lower plate, and one or more trusses, wherein each truss comprises one or more members that join the upper plate to the lower plate so as to couple the upper plate, the lower plate, and the one or more trusses into one unitary structure.

20. The seismic transducer apparatus of claim 10 wherein the polygonal baseplate comprises an upper plate, a lower plate, and a plurality of walls that extend from the upper plate to the lower plate.

21. The seismic transducer apparatus of claim 20 wherein the walls are perpendicular to the upper place and the lower plate, wherein the walls are parallel to each other.

22. A seismic vibrator apparatus comprising:
a frame;
a baseplate attached to the frame, the baseplate having a lower surface for engagement of a ground surface, the lower surface having a perimeter, wherein the perimeter is in the form of a polygon, wherein the polygon comprises at least five sides to form a polygonal baseplate;
wherein the polygonal base plate is comprised of an upper plate, a lower plate, and one or more members that extend from the upper plate to the lower plate so as to couple the upper plate to the lower plate;
a reaction mass supported by the frame; and
a driver configured to actuate the reaction mass in a vertically reciprocating motion so as to impart vibratory energy to the flat lower surface of the polygonal baseplate.

* * * * *